(12) United States Patent
Mahajan et al.

(10) Patent No.: US 8,357,743 B2
(45) Date of Patent: Jan. 22, 2013

(54) PROCESS FOR MAKING POLYESTER NANOCOMPOSITES

(75) Inventors: Surbhi Mahajan, Newark, DE (US); Nathaniel A. Barney, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 280 days.

(21) Appl. No.: 12/822,423

(22) Filed: Jun. 24, 2010

(65) Prior Publication Data

US 2010/0331469 A1    Dec. 30, 2010

Related U.S. Application Data

(60) Provisional application No. 61/221,143, filed on Jun. 29, 2009.

(51) Int. Cl.
*C08K 3/32* (2006.01)
(52) U.S. Cl. .................... 524/417; 524/445; 524/425
(58) Field of Classification Search .................... 524/417
See application file for complete search history.

(56) References Cited

U.S. PATENT DOCUMENTS

| | | | |
|---|---|---|---|
| 3,409,496 A | 11/1968 | McIntyre et al. | |
| 4,929,698 A | 5/1990 | Hagewood | |
| 4,933,427 A | 6/1990 | Charles et al. | |
| 5,061,422 A | 10/1991 | Charles et al. | |
| 5,277,858 A | 1/1994 | Neal | |
| 2006/0157350 A1* | 7/2006 | Williamson et al. | 204/471 |
| 2006/0199890 A1* | 9/2006 | Fasulo et al. | 524/445 |

FOREIGN PATENT DOCUMENTS

| | | |
|---|---|---|
| EP | 0221225 A1 | 5/1987 |
| EP | 0170299 B1 | 1/1990 |
| EP | 0454222 B1 | 1/1996 |
| EP | 1702909 B1 | 11/2009 |
| GB | 1162506 | 8/1969 |
| WO | 2006/012581 A2 | 2/2006 |
| WO | 2006/069128 A1 | 6/2006 |

OTHER PUBLICATIONS

East, et al., Kirk-Othmer Encyclopedia of Chemical Technology, J. Wiley & Sons, vol. 19, pp. 609-653 (1996).
L. Bokobza et al., Polymer International, vol. 53, pp. 1060-1065 (2004).
Reese, Glen, Polyester Fibers, Encyclopedia of Polymer Science and Technology, John Wiley & Sons, Inc. (2002), vol. 3, pp. 652-678.

* cited by examiner

*Primary Examiner* — Doris Lee
(74) *Attorney, Agent, or Firm* — Kevin S. Dobson

(57) ABSTRACT

A method for making polyester nanocomposite materials by polymerization in the presence of exfoliated fibrous clay nanoparticles includes dispersing the nanoparticles in a mixture of diol, water, and sodium salt before polymerization, thereby improving the dispersion of the nanoparticles in the final nanocomposite. This results in enhanced mechanical properties, such as modulus, in articles made from the nanocomposite.

9 Claims, No Drawings

PROCESS FOR MAKING POLYESTER NANOCOMPOSITES

FIELD OF THE INVENTION

The disclosure relates to methods of forming polyester nanocomposites comprising a fibrous clay nanofiller and a polyester.

BACKGROUND

Nanocomposites are polymers reinforced with nanometer sized particles, i.e., particles with a dimension on the order of 1 to several hundred nanometers, herein referred to as "nanoparticles."

Polymer-layered silicate nanocomposites incorporate a layered clay mineral filler in a polymer matrix. Layered silicates are made up of several hundred thin platelet layers stacked into an orderly packet known as a tactoid. Each of these platelets is characterized by a large aspect ratio (diameter/thickness on the order of 100-1000). Accordingly, when the clay is dispersed homogeneously and exfoliated as individual platelets throughout the polymer matrix, dramatic increases in strength, flexural and Young's modulus, and heat distortion temperature are observed at very low filler loadings (<10% by weight) because of the large surface area contact between polymer and filler. Two types of clay minerals are commonly used in nanocomposites: kaolin and smectite. The molecules of kaolin are arranged in two sheets or platelets, one of silica and one of alumina. Smectites, such as sodium montmorillonite and calcium montmorillonite, are arranged in two silica sheets and one alumina sheet. In contrast, fibrous clay particles are made up of aggregates of fibers or ribbons, not sheets or platelets.

In PCT Patent Application WO 2006/069128, herein incorporated by reference in its entirety, a polyester nanocomposite is prepared via in situ polymerization of the polyester precursor(s) in the presence of exfoliated fibrous clay nanoparticles.

H.-C. zur Loye et al., in PCT Application WO2006012581, disclose a process for exfoliating particles into a polymer material wherein the step of combining synthetic oxide particles with a polymeric material comprises the steps of: exfoliating the particles into a monomer; and polymerizing the monomer to form a polymer composite material. Useful synthetic oxides include any synthetic oxides that have a plate-like shape with a thickness of less than about 5 nm and that are capable of being exfoliated into a polymer. Examples are synthetic hectorite and layered perovskites. During exfoliation, the object is to break many layers apart so as to form single layer particles or particles that have only a few layers, which are referred to as tactoids. In one embodiment, this is accomplished by applying shear forces to a solution of up to 5 wt % synthetic oxide particles in ethylene glycol and using the resulting suspension with additional monomers in a polyester polymerization process.

There remains a need for an improved process for preparing a polymer nanocomposite via in situ polymerization with improved dispersion of the nanofiller in order to enhance improvement in properties such as tensile strength and modulus.

SUMMARY OF THE INVENTION

The disclosure is directed to a method for dispersing exfoliated fibrous clay nanoparticles in a polyester that is produced from a reaction mixture containing one or more diols and one or more dicarboxylic acids or esters of dicarboxylic acids, comprising:

a. providing a mixture of exfoliated fibrous clay nanoparticles, at least one of the diols, at least one sodium salt, and water;

b. agitating the mixture for a time sufficient to fully disperse the exfoliated fibrous clay nanoparticles in the mixture;

c. removing at least 80% of the water, thereby producing a slurry of exfoliated fibrous clay nanoparticles dispersed in the at least one diol and the remaining water;

d. preparing a reaction mixture by mixing the slurry produced in (c) with one or more dicarboxylic acids or esters of dicarboxylic acids
and additional diol as needed for the polymerization; and e. polymerizing the reaction mixture prepared in (d) in the presence of a catalyst.

DETAILED DESCRIPTION

In the context of this disclosure, a number of terms shall be utilized.

As used therein, the term "polyester" means a condensation polymer in which more than 50 percent of the groups connecting repeat units are ester groups. Thus polyesters may include polyesters, poly(ester-amides), poly(ester-imides), poly(ether-esters), and the like, so long as more than half of the connecting groups are ester groups.

As used herein, the term "nanocomposite" or "polymer nanocomposite" means a polymeric material which contains "nanoparticles" (i.e., particles having at least one dimension in the 0.1 to 100 nm range) dispersed throughout the polymeric material. The polymeric material in which the nanoparticles are dispersed is often referred to as the "polymer matrix." The term "polyester nanocomposite" refers to a nanocomposite in which the polymeric material includes at least one polyester.

As used herein, the term "fibrous clay" refers to naturally-occurring and synthetic clays which are predominantly characterized by long, slender fibers (which can be hollow), as opposed to plates or grainy structures.

The term "exfoliate" literally refers to casting off in scales, laminae, or splinters, or to spread or extend by or as if by opening out leaves. In the case of smectic clays, "exfoliation" refers to the separation of platelets from the smectic clay and subsequent dispersion of these platelets throughout the polymer matrix. As used herein, for fibrous clays, "exfoliation" or "exfoliated" means the separation of fiber bundles or aggregates into nanoparticles, which are nanometer diameter fibers. These exfoliated fibrous clay nanoparticles, also referred to more concisely as "fibrous clay nanoparticles" or, for specific exfoliated fibrous clays, "sepiolite nanoparticles" or "attapulgite nanoparticles," that are then dispersed throughout the polymer matrix.

As used herein, the term "predispersed" or "predispersion" indicates that the exfoliated fibrous clay nanoparticles are dispersed in the specified water/short-chain diol mixture before being added to the polymerization reaction mixture.

As used herein, the term "TSPP" means tetrasodium pyrophosphate. "TSPP decahydrate" refers specifically to $Na_4P_2O_7 \cdot 10H_2O$. TSPP is also available in an anhydrous form, $Na_4P_2O_7$.

Described herein is a method for dispersing exfoliated fibrous clay nanoparticles in a polyester that is produced from a reaction mixture containing one or more diols and one or more dicarboxylic acids or esters of dicarboxylic acids.

a. providing a mixture of exfoliated fibrous clay nanoparticles, at least one of the diols, at least one phosphorous-containing sodium salt, and water;
b. agitating the mixture for a time sufficient to fully disperse the exfoliated fibrous clay nanoparticles in the mixture;
c. removing at least 80% of the water, thereby producing a slurry of exfoliated fibrous clay nanoparticles dispersed in the at least one diol and the remaining water;
d. preparing a reaction mixture by mixing the slurry produced in (c) with one or more dicarboxylic acids or esters of such dicarboxylic acids and additional diol as needed for the polymerization; and
e. polymerizing the reaction mixture prepared in (d) in the presence of a catalyst.

Moldings prepared from such nanocomposites have higher modulus, particularly at elevated temperatures, than moldings prepared from nanocomposites of the same composition wherein the exfoliated fibrous clay nanoparticles were not predispersed in a mixture of 1,4,-butanediol and water.

Where a range of numerical values is recited herein, unless otherwise stated, the range is intended to include the endpoints thereof, and all integers and fractions within the range. It is not intended that the scope of the invention be limited to the specific values recited when defining a range.

Nanocomposites

The method of preparation of nanocomposites described herein produces a nanocomposite in which dispersion is improved over previous methods, thereby improving mechanical properties such as tensile strength and modulus.

Polyesters

Polyesters are normally derived from one or more dicarboxylic acids and one or more diols. They can also be produced from polymerizable polyester monomers or from macrocyclic or linear polyester oligomers as described in copending U.S. patent application Ser. No. 11/312,068 herein incorporated by reference in its entirety.

Polyesters for use in practicing the invention described herein are derived from one or more dicarboxylic acids or esters of dicarboxylic acid and one or more diols. The polyesters may be amorphous, crystalline, semicrystalline, anisotropic (i.e., liquid crystalline), or isotropic or may contain a mixture of these morphologies. Polyesters most suitable for use in practicing the invention comprise isotropic thermoplastic polyester homopolymers and copolymers (both block and random).

The production of polyesters from reaction mixtures containing diols and dicarboxylic acids or esters of such dicarboxylic acids is well known in the art, as described by A. J. East, M. Golden, and S. Makhija in the *Kirk-Othmer Encyclopedia of Chemical Technology*, John Wiley & Sons, J. I. Kroschwitz exec. ed., M. Howe-Grant, ed., 4$^{th}$ edition (1996), vol. 19, 609-653. Among suitable dicarboxylic acids or esters of dicarboxylic acid (and their corresponding esters) are those selected from the group consisting of terephthalic acid, isophthalic acid, naphthalene dicarboxylic acids, cyclohexane dicarboxylic acids, succinic acid, glutaric acid, adipic acid, sebacic acid, 1,12-dodecane dioic acid fumaric acid, maleic acid, and the derivatives thereof, such as, for example, the dimethyl, diethyl, or dipropyl esters.

Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,2-cyclohexane dimethanol, 1,3-cyclohexane dimethanol, 1,4-cyclohexane dimethanol, 2,2,4,4-tetramethyl-1,3-cyclobutane diol, isosorbide, naphthalene glycols, biphenols, diethylene glycol, triethylene glycol, resorcinol, hydroquinone, t-butyl-hydroquinone, and longer chain diols and polyols, such as polytetramethylene ether glycol, which are the reaction products of diols or polyols with alkylene oxides. Alkyl-substituted and chloro-substituted versions of these species may also be used. Mixtures of any of the above may also be used.

The polyesters may be branched or unbranched, and may be homopolymers or copolymers or polymeric blends comprising at least one such homopolymer or copolymer.

Examples of specific polyesters include without limitation poly(ethylene terephthalate) (PET), poly(1,3-propylene terephthalate) (PPT), poly(1,4-butylene terephthalate) (PBT), a thermoplastic elastomeric polyester having poly(1,4-butylene terephthalate) and poly(tetramethylene ether)glycol blocks (available as HYTREL® from E.I. du Pont de Nemours & Co., Inc., Wilmington, Del. 19898 USA), poly(1,4-cylohexyldimethylene terephthalate) (PCT) and polylactic acid (PLA).

Fibrous Clays

Fibrous clays include naturally-occurring and synthetic clays which are predominantly characterized by long, slender fibers (which can be hollow), as opposed to plates or grainy structures. The individual fibers generally range from about 0.2 to 5 micrometers in length and have a diameter ranging from about 5 to 200 nanometers. Such fibrous clays generally occur as aluminosilicates, magnesium silicates and alumino-magnesium silicates. Examples of fibrous clays include but are not limited to: attapulgite (palygorskite), sepiolite, halloysite, endellite, chrysotile asbestos, and imogolite. Sepiolite and attapulgite, separately or as a mixture, are attractive because of a combination of high length-to-diameter ratio, ready availability, and low cost.

Sepiolite [$Mg_4Si_6O_{15}(OH)_2 \cdot 6(H_2O)$] is a hydrated magnesium silicate filler that exhibits a high aspect ratio due to its fibrous structure. Unique among the silicates, sepiolite is composed of long lath-like crystallites in which the silica chains run parallel to the axis of the fiber. The material has been shown to consist of two forms, an α and a β form. The α form is known to be long bundles of fibers and the β form is present as amorphous aggregates.

Attapulgite (also known as palygorskite) is almost structurally and chemically identical to sepiolite except that attapulgite has a slightly smaller unit cell. As used herein, the term "fibrous clay(s)" includes attapulgite clay, sepiolite clay and mixtures thereof.

Fibrous clays are layered fibrous materials in which each layer is made up of two sheets of tetrahedral silica units bonded to a central sheet of octahedral units containing magnesium ions (see, e.g., FIGS. 1 and 2 in L. Bokobza et al., Polymer International, 53, 1060-1065 (2004)). The fibers stick together to form fiber bundles, which in turn can form agglomerates. These agglomerates can be broken apart by industrial processes such as micronization or chemical modification (see, e.g., European Patent 170,299 to Tolsa, S. A.) to produce nanometer diameter fibers, i.e., exfoliated fibrous clay nanoparticles.

The amount of fibrous clay used in the present process ranges from about 0.1 to about 6 wt % based on the final composite composition. The specific amount chosen will depend on the intended use of the nanocomposite, as is well understood in the art.

Fibrous clays are available in a high purity ("rheological grade"), uncoated form (e.g., PANGEL® S9 sepiolite clay from the Tolsa Group, Madrid, Spain) or, more commonly, treated with an organic material to make the clay more "organophilic," i.e., more compatible with systems of low-to-medium polarity (e.g., PANGEL® B20 sepiolite clay from the Tolsa Group). An example of such a coating for fibrous clay is a quaternary ammonium salt such as dimethylbenzylalkylammonium chloride, as disclosed in European Patent Application 221,225.

In an embodiment, the fibrous clay used in the process described herein is unmodified; i.e., the surface of the fibrous clay has not been treated with an organic compound (such as an onium compound, for example, to make its surface less polar). Such onium compounds tend to degrade at the temperatures used to process polyesters such as PBT and some PET.

In an embodiment, the fibrous clay is rheological grade, such as described in European patent applications EP-A-0454222 and EP-A-0170299 and marketed under the trademark Pangel® by Tolsa, S. A., Madrid, Spain. As described therein, "rheological grade" denotes a fibrous clay with a specific surface area greater than 120 $m^2/g$ ($N_2$, BET), and typical fiber dimensions: 200 to 2000 nm long, 10-30 nm wide, and 5-10 nm thick.

Rheological grade sepiolite is obtained from natural sepiolite by means of special micronization processes that substantially prevent breakage of the sepiolite fibers, such that the sepiolite disperses easily in water and other polar liquids, and has an external surface with a high degree of irregularity, a high specific surface, greater than 300 $m^2/g$ and a high density of active centers for adsorption, that provide it a very high water retaining capacity upon being capable of forming, with relative ease, hydrogen bridges with the active centers. The microfibrous nature of the rheological grade sepiolite nanoparticles makes sepiolite a material with high porosity and low apparent density.

Additionally, rheological grade sepiolite has a very low cationic exchange capacity (10-20 meq/100 g) and the interaction with electrolytes is very weak, which in turn causes rheological grade sepiolite not to be practically affected by the presence of salts in the medium in which it is found, and therefore, it remains stable in a broad pH range.

The above-mentioned qualities of rheological grade sepiolite can also be attributed to rheological grade attapulgite with particle sizes smaller than 40 micrometers, such as for example the range of ATTAGEL goods (for example ATTAGEL 40 and ATTAGEL 50) manufactured and marketed by the firm Engelhard Corporation, United States, and the MIN-U-GEL range of Floridin Company.

In some embodiments, the amount of fibrous clay used in the process described herein ranges from about 0.1 to about 6 wt % based on the combined weight of fibrous clay, water, and diol In some embodiments, the fibrous clay is present in the amount between (and optionally including) any two of the following weight percentages: 0.1, 0.5, 1.0, 1.5, 2.0, 2.5, 3.0, 3.5, 4.0, 4.5, 5.0, 5.5, and 6.0 weight percent based on the combined weight of fibrous clay, water, and diol. The specific amount chosen will depend on the intended use of the nanocomposite composition, as is well understood in the art. For example, in film, it may be advantageous to use as little fibrous clay as possible, so as to retain desired optical properties.

Sodium Salt

At least one sodium salt is added in an amount ranging from about 0.5 to about 12 wt % based on the weight of fibrous clay, where "wt % based on the weight of fibrous clay" is defined as 100 times the weight of sodium salt divided by the weight of fibrous clay; e.g., 4 grams sodium salt plus 50 grams fibrous clay would be 2 wt % sodium salt based on the weight of fibrous clay. In some embodiments, the sodium salt is present in the amount between (and optionally including) any two of the following weight percentages: 0.5, 1, 3, 5, 7, 9, 11, and 12 weight percent of the weight of the fibrous clay. Examples of suitable sodium salts include without limitation: tetrasodium pyrophosphate ("TSPP"), trisodium phosphate ("TSP", $Na_3PO_4$), sodium carbonate ($Na_2CO_3$), and mixtures thereof. The TSPP may be the anhydrous form, $Na_4P_2O_7$ [CAS Reg. No. 7722-88-5], or the hydrated form, "TSPP decahydrate," $Na_4P_2O_7.10H_2O$ [CAS Reg. No. 13472-36-1].

Nanocomposite Preparation

In order to improve the dispersion of the fibrous clay nanoparticles in the polymer matrix, the fibrous clay is predispersed in a mixture of about 46% to about 57% wt % water, about 43 to about 54 wt % diol, based on the combined weight of water plus diol. The at least one sodium salt is also present in the water/diol mixture, in an amount ranging from about 0.5 to about 12 wt % based on the weight of fibrous clay. The mixture is agitated by any appropriate method known in the art for preparing suspensions. In one embodiment, the mixture is stirred using a mechanical stirrer and simultaneously refluxed for about 0.5 to about 3 hours, after which water is removed, by any appropriate method known in the art, typically distillation, thereby producing a slurry of fibrous clay and diol. Distillation removes approximately 80 to 85% of the water. The slurry is allowed to cool, after which stirring continues for about 10 to 20 hours.

The remaining monomer(s) and catalyst are then mixed with the slurry, i.e., the dicarboxylic acid component, and additional diol, the amount depending on how much diol was used in the predispersion process versus how much would normally be used for the polymerization reaction; in one embodiment, all of the required diol may be added in the predispersion process. Polymerization is then carried out. The polymerization processes are carried out in the presence of predispersed fibrous clay in the same manner as if the clay were absent; see, e.g., East et al., op cit. The pretreatment of the fibrous clay with water/diol and sodium salt results in better dispersion of the nanoparticles in the nanocomposite as compared to material made by a process in which the fibrous clay is added to the monomer mixture in dry powder form or made by a process in which the fibrous clay is dispersed by pretreatment with water/diol without sodium salt.

It is also noted that "melt mixing" or, more precisely, applying shear stress to a melt of the nanocomposite material can result in still better dispersion of the fibrous clay nanoparticles. This melt mixing can be a process simply dedicated to improving the dispersion, or can occur when the polyester composite is liquefied and subject to shear for another reason, such as mixing in other materials and or melt forming the nanocomposite composition. Useful types of apparatuses for this purpose include single and twin screw extruders and kneaders. Examples of other materials that can be melt mixed with the nanocomposite materials described herein include without limitation flame retardants, stabilizers, additional inorganic fillers, tougheners, pigments, plasticizers, and other polymers. Some of these materials may also optionally be present during the polymerization process, such as stabilizers, antioxidants, and other materials sometimes added to such processes. Other filler(s) and/or reinforcing agent(s) may also be present in the polymerization, either from the beginning of the process or added during the process as long as they do not interfere with the polymerization itself.

Uses

The polyester nanocomposite materials described herein can be processed easily by conventional thermoplastic processes, including without limitation injection molding, extrusion, blow molding, thermoforming, solution casting, film blowing, calendaring, rotational molding, melt casting or melt spinning. Articles comprising the nanocomposite compositions are particularly useful in appearance parts, packaging, monofilament, and other applications in which engineering plastics are typically used.

Appearance Parts

The compositions described herein (often when having additional optional ingredients present) are particularly useful as "appearance parts", that is parts in which the surface appearance is important. Such parts include automotive body panels such as fenders, fascia, hoods, tank flaps and other exterior parts; interior automotive panels; automotive lighting fixtures (e.g., bezels); parts for appliances (e.g., refrigerators, dishwashers, washing machines, clothes driers, food mixers, hair driers, coffee makers, toasters, and cameras), such as handles, control panels, chassis (cases), washing machine tubs and exterior parts, interior or exterior refrigerator panels, and dishwasher front or interior panels; power tool housings such as drills and saws; electronic cabinets and housings such as personal computer housings, printer housings, peripheral housings, server housings; exterior and interior panels for vehicles such as trains, tractors, lawn mower decks, trucks, snowmobiles, aircraft, and ships; decorative interior panels for buildings; furniture such as office and/or home chairs and tables; and telephones and other telephone equipment. As mentioned above these parts may be painted or they may be left unpainted in the color of the composition.

Nonappearance Parts

Nonappearance parts may also be made with these compositions. These are parts whose surface appearance is not critical. Such parts include those now made with so-called engineering thermoplastics, especially those which are filled with materials which are designed to enhance the composition's physical properties, such as stiffness, toughness, and tensile strength. Examples include but are not limited to electrical connectors, covers for switchboxes or fuses, radiator grille supports, printed circuit boards, plugs, switches, keyboard components, small electric motor components, distributor caps, bobbins, coil-formers, rotors, windshield wiper arms, headlight mountings, other fittings, and conveyor-belt links.

Where the polyester is a thermoplastic elastomer, the nanocomposites will find use in applications that involve some type of repeated mechanical movement, such as bending, flexing, pushing, rotating, pulsing, impacting, or recoiling, since they have a desirable combination of they have an excellent combination of strength, toughness, flexibility and recovery from deformation (see East, op. cit.). Examples of uses include but are not limited to hydraulic hosing, rail car couplers, release binders, auto vacuum control tubing, door lock bumpers, railroad car shock absorbers, headphones; specialty fibers, films, and sheets; jacketing, automotive shock absorbers, diaphragms for railroad cars, corrugated plastic tubing, railroad draft gear, auto electric window drive tapes, CVJ boots, recreational footwear, conductive rubbers, wire coatings, energy management devices, telephone handset cords, compression spring pads, wire clamps, gun holsters, drive belts, run-flat tire inserts, and medical films.

Packaging

Nanocomposite compositions made by the process described herein can be formed into shaped articles useful in packaging applications, such as film, sheet, container, membrane, laminate, pellet, coating, and foam. Articles may be prepared by any means known in the art, such as, but not limited to, methods of injection molding, (co)extrusion, blow molding, thermoforming, solution casting, lamination, and film blowing. The article may be an injection stretch blow molded bottle.

Examples of articles comprising nanocomposite compositions prepared by the process described herein include without limitation packaging for food, personal care (health and hygiene) items, and cosmetics. Packaging refers to either an entire package or a component of a package. Examples of packaging components include, but are not limited, to packaging film, liners, shrink bags, shrink wrap; trays such as but not limited to "CPEO" (crystalline polyethylene terephthalate) trays, including but not limited to frozen food trays; tray/container assemblies, replaceable and nonreplaceable caps, lids, and drink bottle necks.

The package may be in any form appropriate for the particular application, such as a can, box, bottle, jar, bag, cosmetics package, or closed-ended tube. Other examples of packaging for food include without limitation hot fill bottles and jars for, e.g., juices and sports drinks; and plastic cans for, e.g., vegetables, soup, canned stews, meats, and beans.

The packaging may be fashioned by any means known in the art, such as, but not limited to, extrusion, coextrusion, thermoforming, injection molding, lamination, or blow molding.

Some specific examples of packaging for personal care items and cosmetics include, but are not limited to, bottles, jars, and caps for food and for prescription and non-prescription capsules and pills; solutions, creams, lotions, powders, shampoos, conditioners, deodorants, antiperspirants, and suspensions for eye, ear, nose, throat, vaginal, urinary tract, rectal, skin, and hair contact; and lip product.

Monofilament Fiber and Multifilament Yarn

Polymeric monofilaments are used as reinforcements for rubber articles, fishing lines, toothbrush bristles, paintbrush bristles and the like. In addition, woven fabrics produced from monofilaments are used, for example, in industrial belts and paper machine clothing. Polyester filaments are also employed in industrial applications such as tire cords, composites, belts, and textiles.

Multifilament yarns can be produced comprising the polyester nanocomposites described herein using any of the typical processes well known in the art for making multifilament polyester yarns (see, e.g., Reese, Glen, "Polyesters, Fibers" in *Encyclopedia of Polymer Science and Technology*, John Wiley & Sons, Inc. (2002), vol. 3, 652-678; U.S. Pat. Nos. 3,409,496, 4,933,427, 4,929,698, 5,061,422, 5,277,858; British Patent 1,162,506). Textile filament yarns are continuous yarns produced at high speeds and are used for fabrics with silk-like esthetics. Industrial filament yarns are used for rubber reinforcement and high strength industrial fabrics.

EXAMPLES

The process described herein is further defined in the following Examples. It should be understood that these Examples, while indicating embodiments of the invention, are given by way of illustration only. From the above discussion and these Examples, one skilled in the art can ascertain the essential characteristics of the process described herein, and without departing from the spirit and scope thereof, can make various changes and modifications of the process to adapt it to various uses and conditions.

The meaning of abbreviations is as follows: "3GT" means poly(propylene terephthalate), "DMA" means dynamic mechanical analysis, "DSC" means differential scanning calorimetry "g" means gram(s), "gf" means gram force, "GPa" means gigapascal(s), "h" means hour(s), "HDT" means heat distortion temperature, "in" means inch, "J" means Joule(s), "lb" means pound(s), "mg" means milligram(s), "min" means minute(s), "mL" means milliliter(s), "mm" means millimeter(s), "$M_n$" means number average molecular weight, "MPa" means megapascal(s), "mtorr" means millitorr, "PBT" means poly(butylene terephthalate), "PDI" mean polydispersity index and equals the weight-average molecular weight divided by $M_n$, "psi" means pounds per square inch, "rpm" means revolutions per minute, "SEC" means size exclusion chromatography, "TEM" means transmission electron microscopy, "$T_g$" means glass transition temperature, "$T_m$" means melting temperature, "μm" means micrometer(s), and "μL" means microliter(s).

Materials.

Dimethyl terephthalate (CAS #120-61-6, "DMT," ≧99% purity), 1,3-propanediol (CAS #504-63-2, 99.6+%), and 1,4-butanediol (CAS #504-63-2, 99%) were purchased from Aldrich Chemical Company (Milwaukee, Wis., USA). "Tyzor" TPT (CAS #546-68-9, 99-100%) and "Tyzor" TnTBT Titanate (CAS #5593-70-4, 95-99% purity) catalysts and a sample of Sorona® 3GT polyester were obtained from E.I. du Pont de Nemours & Co., Inc. (Wilmington, Del., USA). Pangel® S-9, a rheological grade sepiolite clay that has an unmodified surface, was purchased from EM Sullivan Associates, Inc. (Paoli, Pa., USA), a distributor for the manufacturer, Tolsa S.A. (Madrid, Spain). Tetrasodium pyrophosphate decahydrate was obtained from Rhodia (Paris, France).

Analytical Methods

Extrusion

The 3GT based samples were extruded using a DSM mini twin screw extruder set at 245° C. and 100 rpm. The material was charged to the extruder under a nitrogen blanket. After the material is completely molten and the force on the screws becomes relatively constant, the material was transferred into a transfer cylinder maintained at 230° C., followed by transfer into a mold set at 100° C.

SEC

A size exclusion chromatography ("SEC") system comprised of a Model Alliance 2690™ from Waters Corporation (Milford, Mass.), with a Waters 410™ refractive index detector (DR1) and Viscotek Corporation (Houston, Tex.) Model T-60A™ dual detector module incorporating static right angle light scattering and differential capillary viscometer detectors was used for molecular weight characterization. The mobile phase was 1,1,1,3,3,3-hexafluoro-2-propanol (HFIP) with 0.01 M sodium trifluoroacetate. The dn/dc was measured for the polymers and it was assumed that all of the sample was completely eluted during the measurement.

Differential Scanning Calorimetry ("DSC")

Standardization: The temperature scale was calibrated monthly with the onset melting of three metals: mercury (−38.8° C.), indium (156.6° C.) and tin 231.7° C. (or zinc) at the 10° C./min rate or at the desired heating rate. The calorimetric scale (cell constant) was calibrated in the same time frame using the indium heat of fusion of 28.42 J/g. The Cp constant was calibrated using the vendor suggested procedure.

DSC heat and cool, reheat protocol: 7-10 mg of specimen, crimped in a standard aluminum DSC pan and lid, was heated in a TA Instruments Q1000 or Q2000 DSC at a rate of 10° C./min with the aid of a mechanical cooler for temperature controlling. The starting temperature was generally 30° C. below the $T_g$ of the material; the end temperature was set at 30° C. above the last crystal melting temperature. For more than one cycle, the temperature was held at 30° C. above the last crystal melting temperature for 3 minutes; the material was then cooled at a rate of 10° C./min to 0° C., after which the 2nd cycle heating was begun. The glass, melting and crystallization transitions were marked. The crystallinity was calculated by dividing the total heat of fusion by the heat of fusion of 100% crystalline material.

Dynamic Mechanical Analysis ("DMA")

Standardization: The clamp calibration was performed whenever the clamp was switched (e.g., tensile to dual cantilever), including the weight of movable clamp, offset and compliance. The temperature scale was calibrated once using a special device for penetrating a needle into indium metal at 156.6° C.; and again by the loss modulus of the peak temperature of the glass transition at 1 Hz of a sample of Lexan® polycarbonate [formerly a trademark of General Electric, now owned by Saudi Basic Industries Corp., Riyadh, Saudi Arabia]. The modulus check used the storage modulus of the same polycarbonate at 25° C. of 2.25 GPa+/−10%.

DMA standard single ramp protocol: The specimen was mounted in the DMA jaws with 10 in-lb (1.13 J) torque in the appropriate clamp assembly, e.g., 35 mm or 20 mm or 8 mm, depending on the thickness of specimen allowing the closest 10:1 of length to thickness rule. The specimen was cooled with the aid of a gas cooling accessory to −100° C. and the specimen re-torqued in the jaws. The specimen was then heated at 2° C./min at 6 frequencies (1, 3, 5, 10, 20, 50 Hz) to a temperature below the melting point (e.g., 150° C.) at 10 μm oscillation amplitude. The modulus of interest and transition temperature were marked.

Heat Distortion Temperature (also known as "heat deflection temperature," "deflection temperature under load," or DTUL) was measured using ASTM method E2092-03.

Tensile modulus and strength measurements were done in accordance with ASTM D638-03 specifications at an extension rate of 0.20" per minute . . . .

Cryoultramicrotomy and TEM Imaging of Nanocomposite Compositions

To prepare ultrathin specimens for transmission electron microscopy ("TEM"), a diamond knife was used to cut sample sections by low temperature ultramicrotomy. The knife boat used to accumulate sections was filled with absolute ethanol to prevent freezing at the −90° C. operating temperature. A specimen block was trimmed with single edge razor blades. The block was secured in the flat jaws of the cryoultramicrotome sample holder and sectioned to a nominal thickness of 90 nm. After sectioning was complete, the boat fluid with the sample sections was poured into a shallow dish of water. The sections floated on the water/alcohol mixture and were retrieved on copper mesh grids, and blotted on filter paper. The sectioning procedure should be carried out by one skilled in the art.

Unstained sections were examined in a Transmission Electron Microscope (TEM) operated at 200 KV accelerating voltage. Images of magnification 1000-85,000× were recorded on a digital camera. Sampling of both well dispersed, individual rodlike nanoparticles of sepiolite and poorly dispersed clumps of mineral above 1 micron in diameter were documented. The imaging procedure should be carried out by one skilled in the art.

Optical microscopy was used to examine polyester nanocomposite fibers

Example 1

This example illustrates the preparation of a nanocomposite of exfoliated sepiolite nanoparticles in a matrix of 3GT, where the sepiolite nanoparticles are predispersed in a diol/water/sodium salt mixture.

Neat 3GT (Control) Polymerization

Dimethyl terephthalate (123.5 g, 0.64 mol), and 1,3-propanediol (87.1 g, 1.14 mol) were charged to a 500 mL three-necked round bottom flask to form a reaction mixture. An overhead stirrer and a distillation condenser were attached. The reactants were stirred at a speed of 10 rpm. The reaction mixture was kept under a $N_2$ purge atmosphere. The contents were degassed three times by evacuating down to 500 mtorr and refilling with $N_2$ gas. The flask was then immersed in a preheated metal bath set at 160° C. and the stirrer speed was slowly increased to 180 rpm. The solids were allowed to melt completely at 160° C. 92 μL of catalyst Tyzor®TPT was added under a $N_2$ blanket. The temperature was increased to 210° C. The system was maintained at 210° C. for 40 minutes to distill off most of the methanol. Finally, the temperature was increased to 250° C. and was held constant for 30 min. The nitrogen flush was closed off and vacuum ramp was started. After 60 min, the vacuum reached a value of 54 mtorr. The reaction mixture was maintained under vacuum for approximately 4 h. The properties of the resulting polymer were determined as described above: $M_n$=23900, $M_w$=42700, $T_g$=57° C., $T_m$=229° C., and percent crystallinity=35.8%.

Nanocomposite Preparation, with Sodium Salt

Sepiolite clay (Pangel® S-9, 5.18 g), water (61.0 g), 1,3-propanediol (86.8 g, 1.14 mol), and TSPP decahydrate (0.052 g, 1.16×10$^{-4}$ mol) were added to a 500 mL three-necked round bottom flask. The contents were refluxed for 2 h while the mixture was agitated with a mechanical stirrer. Water was distilled off, and over 58 mL of water fraction was recovered in the distillate, leaving behind a dispersion of sepiolite clay in 1,3-propanediol with some remnant water and TSPP decahydrate. The dispersion was stirred overnight under $N_2$. The next day, dimethyl terephthalate (123.0 g, 0.63 mol) was added to the dispersion to form a reaction mixture. An overhead stirrer and a distillation condenser were attached. The reaction mixture was evacuated to 0.5 torr and refilled with $N_2$ gas; this process was followed two more times. The flask was immersed in a preheated metal bath set at 160° C., and the stirrer speed was slowly increased to 180 rpm. The solids (other than the sepiolite) were allowed to melt completely at 160° C. 500 μl of catalyst Tyzor®TPT was added under a $N_2$ blanket. The temperature was increased to 210° C. The system was maintained at 210° C. for 50 minutes to distill off most of the methanol. Finally, the temperature was increased to 250° C. and was held constant for 30 min. The nitrogen flush was closed off and vacuum ramp was started. After 36 min, the vacuum reached a value of 47 mtorr. The reaction mixture was maintained under vacuum for approximately 120 min. The properties of the polymer matrix of the resulting nanocomposite were determined as described above: $M_n$=14500, $M_w$=26400, $T_g$=56° C., $T_m$=228° C., and percent crystallinity 34.7%. The inorganic ash content of the nanocomposite was 3.29% by weight. TEM images confirmed good dispersion of the sepiolite particles in the sample, including a large proportion of individual rods.

Comparative Example A

This comparative example illustrates preparation and properties of a 3GT/sepiolite nanocomposite prepared without predispersing the sepiolite in a water/diol/sodium salt mixture.

Sepiolite clay (Pangel® S-9, 5.18 g), 1,3-Propanediol (86.8 g, 1.14 mol) and dimethyl terephthalate (123.0 g, 0.63 mol) were charged to a 500 mL three-necked round bottom flask. A distillation condenser was attached. The reactants were stirred at a speed of 10 rpm. The contents were degassed three times by evacuating down to 500 mtorr and refilling with $N_2$ gas. The flask was immersed in a preheated metal bath set at 160° C., and the stirrer speed was slowly increased to 180 rpm. The solids (other than the sepiolite) were allowed to melt completely at 160° C. 500 μl of catalyst Tyzor®TPT was added under a $N_2$ blanket. The temperature was increased to 210° C. The system was maintained at 210° C. for 60 minutes to distill off most of the methanol. Finally, the temperature was increased to 250° C. and was held constant for 30 min. The nitrogen flush was closed off and vacuum ramp was started. After 36 min, the vacuum reached a value of 50 mtorr. The reaction was maintained under vacuum for approximately 120 min. The properties of the polymer matrix of the resulting nanocomposite were determined as described above: $M_n$=27500, $M_w$=46200, $T_g$=55° C., $T_m$=229° C., and percent crystallinity=31.2%. The inorganic ash content of the nanocomposite was 3.23% by weight. TEM images showed poorer dispersion of the sepiolite particles in the sample than for Example 1, mainly aggregates with few individual rods.

Dynamic Mechanical Analysis ("DMA") was used as described above over a wide temperature range to determine the storage modulus (E', energy stored elastically during deformation) and tan δ (loss tangent=the ratio of storage modulus E' to loss modulus E", where the loss modulus is the energy converted to heat during deformation) of the nanocomposites prepared in Example 1 and Comparative Example A, as well as the lab control 3GT polymer sample and as a second control, commercially available Sorona® 3GT polymer sample obtained from E.I. du Pont de Nemours & Co., Inc. (Wilmington, Del., USA). Results are presented in Table 1.

Both in-situ polymerized 3GT/sepiolite nanocomposites were stiffer than (i.e., had higher storage modulus and higher tensile modulus than) both 3GT controls and had higher heat distortion temperatures. However, the nanocomposite which was prepared in Example 1, including predispersion of the sepiolite in a mixture of water/diol/sodium salt, showed higher storage modulus throughout the temperature range studied, −100° C. to +150° C., than the nanocomposite prepared without this predispersion.

TABLE 1

| Sample | Ash Vol %* | Storage Modulus (MPa) 25° C. | Storage Modulus (MPa) 100° C. | Storage Modulus (MPa) 150° C. | HDT @ 66 psi (0.455 MPa) (° C.) | Storage Modulus at HDT (MPa) | Tensile Modulus (MPa) | Tensile Strength (MPa) |
|---|---|---|---|---|---|---|---|---|
| Commercial 3GT (control) | | 1962 | 334.7 | 217.7 | 169.5 | 189 | 2542 | 60.8 |
| Lab 3GT (control) | | 2346 | 454.6 | 276 | 183.0 | 207 | 2669 | 66.1 |
| Comparative Example A | 1.47 | 2660 | 548.9 | 338 | 189.0 | 237 | 3140 | 69.2 |
| Example1 | 1.49 | 2957 | 758.2 | 498.2 | 191.5 | 344 | 3632 | 60.4 |

*Calculated from ash wt % using a sepiolite density of 2.2 g/cm$^3$

Example 2

This example demonstrates the effect of predispersing the sepiolite nanoparticles in a diol/water/sodium salt mixture on the homogeneity of fiber spun from PBT/sepiolite nanocomposites.

Neat PBT (Control) Polymerization

Dimethyl terephthalate (110.86 g, 0.57 mol) and 1,4-butanediol (85.47 g, 0.95 mol) were added to a 500 mL three-necked round bottom flask to form a reaction mixture. An overhead stirrer and a distillation condenser were attached to the round bottom flask. The flask was evacuated to 0.5 torr and refilled with $N_2$ gas; this process was followed two more times. After the first evacuation, 90 µl of catalyst Tyzor®TnTBT was added to the reaction mixture under a nitrogen blanket. The reaction mixture was heated to 160° C. under a light nitrogen flush, while the stirrer speed was maintained at 10 rpm. The solids (other than sepiolite) were allowed to melt completely at 160° C. and the stirrer speed was increased to 180 rpm. After 20 minutes, the temperature was increased to 225° C. The system was maintained at 225° C. for 40 minutes to allow most of the methanol to distill off. Finally, the temperature was increased to 250° C. The nitrogen flush was closed off and vacuum ramp was started. After 22 min, the vacuum reached a value of 97 mtorr. The reaction mixture was maintained under vacuum for 74 min. The properties of the resulting polymer were determined as described above: $T_g$=44° C., $T_m$=211° C., 222° C., percent crystallinity=35.6%.

Nanocomposite Preparation, with Sodium Salt

Sepiolite clay (Pangel® S-9, 3.88 g), 80.0 g of water, 1,4-butanediol (85.47 g, 0.95 mol), and TSPP decahydrate (0.039 g, 8.7×10$^{-5}$ mol) were added to a 500 mL three-necked round bottom flask. The contents were refluxed for 2 h while the mixture was agitated with a mechanical stirrer. Water was distilled off, and 60.91 g of water fraction was recovered in the distillate, leaving behind a dispersion of sepiolite clay in 1,4-butanediol with some remnant water and TSPP. The dispersion was allowed to stir overnight under $N_2$. The next day dimethyl terephthalate (110.86 g, 0.57 mol) was added to this dispersion to form a reaction mixture. An overhead stirrer and a distillation condenser were attached. The reaction mixture was evacuated to 0.5 torr and refilled with $N_2$ gas; this process was followed three more times. After the first evacuation, 90 µl of catalyst Tyzor®TnTBT was added to the reaction mixture under a nitrogen blanket. The reaction mixture was heated to 160° C. under a light nitrogen flush, while the stirrer speed was maintained at 10 rpm. The solids (other than sepiolite) were allowed to melt completely at 160° C. and the stirrer speed was increased to 180 rpm. After 20 minutes, the temperature was increased to 225° C. The system was maintained at 225° C. for 40 minutes to allow most of the methanol to distill off. Finally, the temperature was increased to 250° C. The nitrogen flush was closed off and vacuum ramp was started. After 30 min, the vacuum reached a value of 42 mtorr. The reaction mixture was maintained under vacuum for 2 h. The properties of the polymer matrix of the resulting nanocomposite were determined as described above: $M_n$=22700, PDI=2.52, $T_g$=42° C., $T_m$=216° C., 225° C., percent crystallinity=32.9%.

Comparative Example B

This comparative example illustrates preparation and properties of a PBT/sepiolite nanocomposite prepared without predispersing the sepiolite in a water/diol/sodium salt mixture.

Dimethyl terephthalate (132.35 g, 0.68 mol), 1,4-butanediol (102.13 g, 1.13 mol), and sepiolite clay (Pangel® S-9, 4.5 g) were charged to a 500 mL three necked round bottom flask to form a reaction mixture. An overhead stirrer and a distillation condenser were attached. The reactants were stirred at a speed of 10 rpm. The reaction mixture was kept under $N_2$ purge atmosphere. The contents were degassed three times by evacuating down to 500 mtorr and refilling with $N_2$ gas. After the first evacuation, 120 µl of catalyst Tyzor®TnTBT was added to the reaction mixture under a nitrogen blanket. The reaction mixture was heated to 150° C. under a light nitrogen flush. The solids (other than sepiolite) were allowed to melt completely at 150° C. After 20 minutes, the temperature was increased to 225° C. and the stirrer speed was increased to 180 rpm. The system was maintained at 225° C. for 40 minutes to distill off most of the methanol. Finally, the temperature was increased to 250° C. The nitrogen flush was closed off and vacuum ramp was started. After 28 min, the vacuum reached a value of 90 mtorr. The reaction mixture was maintained under vacuum for approximately 60 min. The properties of the polymer matrix of the resulting nanocomposite were determined as described above: $M_n$=23000, PDI=2.37, $T_g$=40.4° C., $T_m$=213° C., 222° C., percent crystallinity=39%.

Samples of the neat PBT polymer (control) and the nanocomposites prepared in Example 2 and Comparative Example B were dried at 100° C. for 16 hours and then melt spun into fiber. The spinneret orifice had only one hole which was 0.012" (0.305 mm) in diameter and 0.036" (0.914 mm) long. The nanocomposite fibers were spun at 280° C. and 0.7 grams/minute/hole, while PBT polymer control spun better at 285° C. A filtration make up had a 50 mesh support screen with two one hundred mesh screens on top. All the fiber samples were collected at 1415 meters/minute winding speed. Optical images of the spun fibers (100x) indicated the fibers made from Comparative Example B nanocomposite to be visually quite rough and inhomogeneous. In contrast, the fibers made from Example 2 nanocomposite were much smoother, more like the neat PBT fibers in appearance except for an occasional circumscribed bump rising from the fiber surface.

As shown in Table 2, the fiber modulus is significantly improved over the neat polymer in Example 2, but not at all in Comparative Example B.

TABLE 2

| Sample | Modulus (gf/denier) | Standard Deviation |
| --- | --- | --- |
| Neat PBT polymer | 21.9 | 1 |
| Comparative Example B | 21.4 | 2.4 |
| Example 2 | 31.7 | 1.6 |

Where a range of numerical values is recited herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

In this specification, unless explicitly stated otherwise or indicated to the contrary by the context of usage,
  (a) amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value;
  (b) all numerical quantities of parts, percentage or ratio are given as parts, percentage or ratio by weight;
  (c) use of the indefinite article "a" or "an" with respect to a statement or description of the presence of an element or feature of this invention, does not limit the presence of the element or feature to one in number; and
  (d) the words "include", "includes" and "including" are to be read and interpreted as if they were followed by the phrase "without limitation" if in fact that is not the case.

The invention claimed is:

1. A method for dispersing exfoliated fibrous clay nanoparticles in a polyester that is produced from a reaction mixture containing one or more diols and one or more dicarboxylic acids or esters of dicarboxylic acids, comprising:
  (a) providing a mixture of exfoliated fibrous clay nanoparticles, at least one diol, at least one sodium salt, and water;
  (b) agitating the mixture for a time sufficient to fully disperse the exfoliated fibrous clay nanoparticles in the mixture;
  (c) removing at least 80% of the water, thereby producing a slurry of exfoliated fibrous clay nanoparticles dispersed in the at least one diol and the remaining water;
  (d) preparing a reaction mixture by mixing the slurry produced in (c) with one or more dicarboxylic acids or esters of dicarboxylic acids and at least one diol as needed for polymerization; and
  (e) polymerizing the reaction mixture prepared in (d) in the presence of a catalyst,
  wherein the amount of water in step (a) is about 46 wt % to about 57% wt % based on the weight of water and diol.

2. The method of claim 1 wherein the at least one diol is selected from the group consisting of ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,2-cyclohexane dimethanol, 1,3-cyclohexane dimethanol, 1,4-cyclohexane dimethanol, 2,2,4,4-tetramethyl-1,3-cyclobutane diol, isosorbide, naphthalene glycols, biphenols, diethylene glycol, triethylene glycol, resorcinol, hydroquinone, t-butyl-hydroquinone, polytetramethylene ether glycol and other longer chain diols and polyols which are the reaction products of diols or polyols with alkylene oxides, alkyl-substituted and chloro-substituted versions of said diols, and mixtures thereof.

3. The method of claim 1 wherein the one or more dicarboxylic acids or esters of dicarboxylic acids is selected from the group consisting of terephthalic acid, isophthalic acid, naphthalene dicarboxylic acids, cyclohexane dicarboxylic acids, succinic acid, glutaric acid, adipic acid, sebacic acid, 1,12-dodecane dioic acid fumaric acid, maleic acid; the dimethyl, diethyl, and dipropyl esters thereof; and mixtures thereof.

4. The method of claim 1 wherein the polyester is selected from the group consisting of: poly(ethylene terephthalate), poly(1,3-propylene terephthalate), poly(1,4-butylene terephthalate), a thermoplastic elastomeric polyester having poly(1,4-butylene terephthalate) and poly(tetramethylene ether)glycol blocks, poly(1,4-cylohexyldimethylene terephthalate), and polylactic acid.

5. The method of claim 1 wherein the amount of fibrous clay in step (a) is about 0.1 to about 6.0 wt % based on the combined weight of fibrous clay, water, and diol.

6. The method of claim 1 wherein the amount of sodium salt in step (a) is about 0.5 to about 12 wt % based on the weight of fibrous clay.

7. The method of claim 1 wherein the fibrous clay is unmodified.

8. The method of claim 1 wherein the fibrous clay is sepiolite, attapulgite, or a mixture thereof.

9. The method of claim 1 wherein the sodium salt is anhydrous tetrasodium pyrophosphate, tetrasodium pyrophosphate decahydrate, trisodium phosphate, sodium carbonate, or a mixture thereof.

* * * * *